(12) United States Patent
Esfahani et al.

(10) Patent No.: US 11,523,158 B2
(45) Date of Patent: *Dec. 6, 2022

(54) SECURE REMOTE-LESS CONFIGURATION OF A MEDIA PLAYBACK DEVICE

(71) Applicant: Roku, Inc., San Jose, CA (US)

(72) Inventors: Cameron Esfahani, San Jose, CA (US); Brian King, San Jose, CA (US); Mark Young, San Jose, CA (US); Alex Bishop, San Jose, CA (US)

(73) Assignee: ROKU, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/532,546

(22) Filed: Nov. 22, 2021

(65) Prior Publication Data

US 2022/0103882 A1 Mar. 31, 2022

Related U.S. Application Data

(63) Continuation of application No. 16/934,210, filed on Jul. 21, 2020, now Pat. No. 11,184,657.

(51) Int. Cl.
*H04N 21/258* (2011.01)
*H04W 76/10* (2018.01)
*H04N 21/443* (2011.01)
*H04N 21/6377* (2011.01)
*H04N 21/422* (2011.01)

(52) U.S. Cl.
CPC . *H04N 21/25816* (2013.01); *H04N 21/25875* (2013.01); *H04N 21/4222* (2013.01); *H04N 21/443* (2013.01); *H04N 21/63775* (2013.01); *H04W 76/10* (2018.02)

(58) Field of Classification Search
CPC ....... H04N 21/25816; H04N 21/25875; H04N 21/4222; H04N 21/43637; H04N 21/443; H04N 21/4532; H04N 21/63775; H04N 21/6547; H04N 21/6582; H04W 76/10
See application file for complete search history.

(56) References Cited

U.S. PATENT DOCUMENTS 8,443,407 B2 * 5/2013 Gaede ................. H04N 21/436
725/38
10,492,236 B2 * 11/2019 Li ........................ G06K 7/1417
(Continued)

*Primary Examiner* — Michael B. Pierorazio
(74) *Attorney, Agent, or Firm* — Sterne, Kessler, Goldstein & Fox P.L.L.C.

(57) ABSTRACT

The present disclosure is directed to embodiments for securely reconfiguring a media playback device. For example, a method may include determining whether a media playback device is being controlled by a user. In response to determining that the media playback device is not being controlled by the user, the method may further include: causing display of a pictograph that includes an encrypted payload with information for wirelessly connecting to the media playback device and is configured to be scanned by a client device; determining whether a request from the client device to wirelessly connect to the media playback device is a valid request; in response to the request being valid, wirelessly connecting the client device to the media playback device via a soft access point; and receiving, at the media playback device, information for reconfiguring the media playback device.

20 Claims, 4 Drawing Sheets

(56) References Cited

U.S. PATENT DOCUMENTS

| | | | | |
|---|---|---|---|---|
| 2002/0162121 A1* | 10/2002 | Mitchell | ............ | H04N 21/4782 |
| | | | | 348/E5.103 |
| 2002/0195495 A1* | 12/2002 | Melick | ................... | G06Q 20/04 |
| | | | | 235/462.01 |
| 2010/0070759 A1* | 3/2010 | Leon Cobos | ........... | H04L 63/18 |
| | | | | 713/176 |
| 2010/0175102 A1* | 7/2010 | Kuang | ................... | G08C 17/00 |
| | | | | 725/141 |
| 2011/0195663 A1* | 8/2011 | Sakai | ...................... | H04L 12/66 |
| | | | | 455/41.2 |
| 2011/0289537 A1* | 11/2011 | Buehl | ................ | H04N 21/4223 |
| | | | | 725/98 |
| 2012/0138671 A1* | 6/2012 | Gaede | ................ | H04N 21/4223 |
| | | | | 235/375 |
| 2012/0153015 A1* | 6/2012 | Gomez | ............ | H04N 21/41407 |
| | | | | 235/375 |
| 2012/0159563 A1* | 6/2012 | Gomez | ............. | H04N 21/4227 |
| | | | | 725/132 |
| 2012/0222071 A1* | 8/2012 | Gaede | ............ | H04N 21/43622 |
| | | | | 725/38 |
| 2013/0048710 A1* | 2/2013 | Marsico | ............. | G06F 16/9554 |
| | | | | 235/375 |
| 2013/0291041 A1* | 10/2013 | Cheung | ................ | H04L 65/612 |
| | | | | 725/110 |
| 2013/0298155 A1* | 11/2013 | Stepanov | ......... | H04N 21/25875 |
| | | | | 725/31 |
| 2016/0112767 A1* | 4/2016 | Park | ................ | H04N 21/44008 |
| | | | | 725/116 |

\* cited by examiner

SECURE REMOTE-LESS CONFIGURATION OF A MEDIA PLAYBACK DEVICE

RELATED APPLICATION

The present application is a continuation of U.S. patent application Ser. No. 16/934,210, filed Jul. 21, 2020, which is herein incorporated by reference in its entirety.

BACKGROUND

Media playback devices may be operated by a user using a remote control. However, in some instances, a media playback device may not be able to be operated using the remote control. For example, the media playback device may have been factory reset or never setup, such that the remote control is not available for use. As another example, the media playback device may have been previously set up and associated with a user account for a provider of the media playback device, and the remote control may have been lost or damaged, such that the remote control can no longer be used to operate the media playback device. In this example, though, a user may continue operating the media playback device using alternative means (such as a mobile application of the provider on a client device), which may control the media playback device over a common wireless network shared by the client device and the media playback device. Even in this situation, however, the user may lose the ability to control the media playback device using the mobile application if the network identification and/or password has changed for any reason, e.g., changing service providers, relocation, changing physical hardware, such as the router, and/or the user changing the network settings.

BRIEF SUMMARY

According to some aspects, an example embodiment is directed to a method that may include determining whether a media playback device is being controlled by a user. In response to determining that the media playback device is not being controlled by the user, the method may further include: causing display of a pictograph that includes an encrypted payload with information for wirelessly connecting to the media playback device and is configured to be scanned by a client device; determining whether a request from the client device to wirelessly connect to the media playback device is a valid request; in response to the request being valid, wirelessly connecting the client device to the media playback device via a soft access point; and receiving, at the media playback device, information for reconfiguring the media playback device.

According to some aspects, an example embodiment is directed to a system that includes a memory and a processor coupled to the memory. The processor may be configured to determine whether a media playback device is being controlled by a user. In response to determining that the media playback device is not being controlled by the user, the processor may be further configured to: cause display of a pictograph that includes an encrypted payload with information for wirelessly connecting to the media playback device and is configured to be scanned by a client device; determine whether a request from the client device to wirelessly connect to the media playback device is a valid request; in response to the request being valid, wirelessly connect the client device to the media playback device via a soft access point; and receive information for reconfiguring the media playback device According to some aspects, an example embodiment is directed to a non-transitory, tangible computer-readable device having instructions stored thereon that, when executed by at least one computing device, causes the at least one computing device to perform operations. The operations may include determining whether a media playback device is being controlled by a user. In response to determining that the media playback device is not being controlled by the user, the operations may further include: causing display of a pictograph that includes an encrypted payload with information for wirelessly connecting to the media playback device and is configured to be scanned by a client device; determining whether a request from the client device to wirelessly connect to the media playback device is a valid request; in response to the request being valid, wirelessly connecting the client device to the media playback device via a soft access point; and receiving, at the media playback device, information for reconfiguring the media playback device.

Further features and advantages of the embodiments disclosed herein, as well as the structure and operation of various embodiments, are described in details below with reference to the accompanying drawings. It is noted that this disclosure is not limited to the specific embodiments described herein. Such embodiments are presented herein for illustrative purposes only. Additional embodiments will be apparent to a person skilled in the relevant art based on the teachings contained herein.

BRIEF DESCRIPTION OF THE DRAWINGS/FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

It is to be appreciated that the Detailed Description section, and not the Summary and Abstract sections, is intended to be used to interpret the claims. The Summary and Abstract sections may set forth one or more but not all example embodiments as contemplated by the inventor(s), and thus, are not intended to limit the appended claims in any way.

Figure 1:
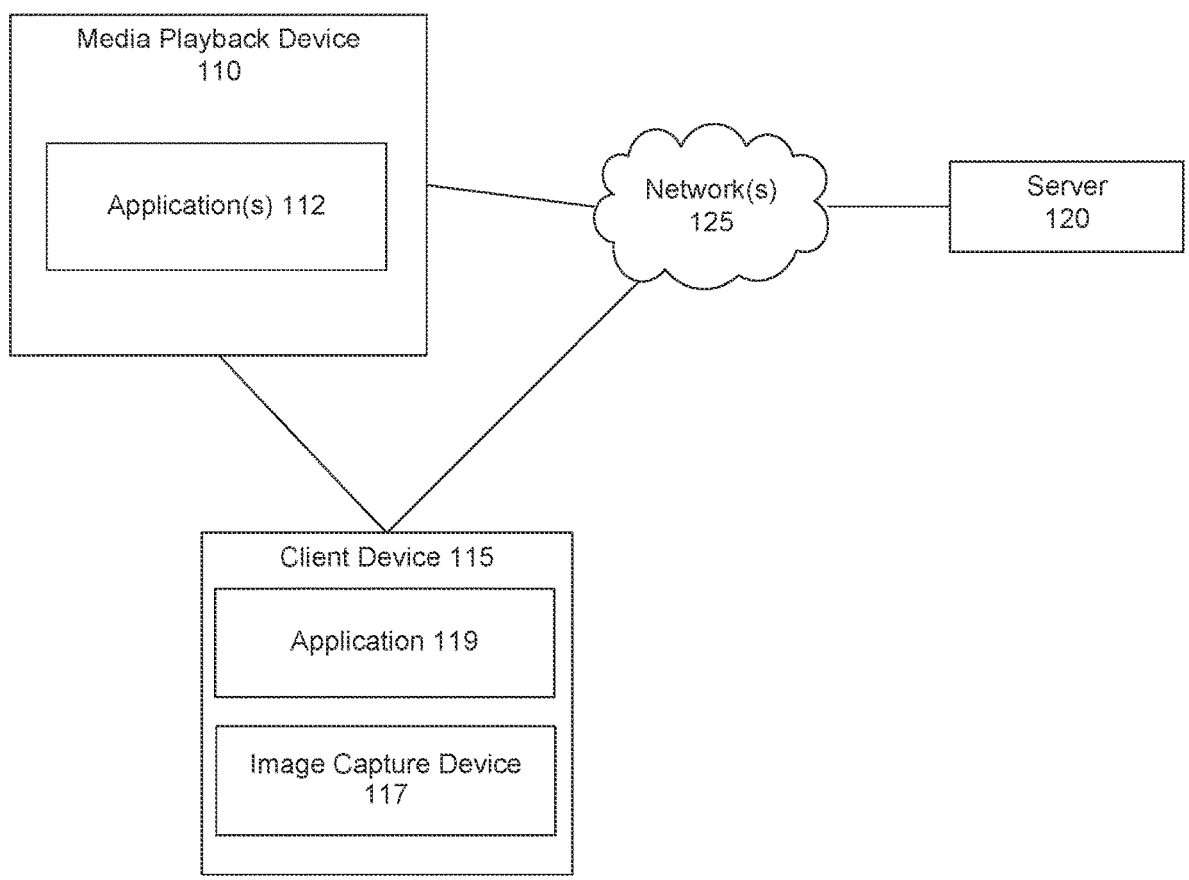
FIG. 1 is a block diagram of a system, according to some example embodiments.

FIG. 1 is a diagram of an example environment 100 in which example systems, methods and/or computer program products (and combinations and sub-combinations thereof) may be implemented. As shown in FIG. 1, an environment 100 may include a media playback device 110, a client device 115, a server 120, and a network 125. Devices of the environment 100 may interconnect via wired connections, wireless connections, or a combination of wired and wireless connections. Devices of environment 100 may include a computer system 300 shown in FIG. 3, discussed in greater detail below.

In some embodiments, the media playback device 110 may be any device that may be used to stream content. For example, the media playback device 110 may be, without limitation, a media player, television, a wireless device, a smartphone, a tablet computer, a laptop/mobile computer, a handheld computer, a server computer, an in-appliance device, Internet of Things (IoT) device, streaming media player, a game console, and/or an audio/video receiver, to name just some examples. The media playback device 110 may include one or more applications 112 for streaming media content from a respective provider. For example, the one or more applications 112 may be applications that provide media content, such as, but not limited to, video content, audio content, or the like. In some embodiments, the media playback device 110 may store account information associated with a user, e.g., an email address, a password, payment information, or the like. Therefore, to protect this information, in situations where the media playback device 110 cannot be controlled by the user, the media playback device may be reconfigured using the processes described herein.

In some embodiments, the media playback device 110 may include a cryptographic certificate, such as a public key, that can be used by the server 120 to identify the media playback device 110. In some embodiments, the public key may be encrypted, along with additional data, using, for example, an advanced encryption standard (AES) or secure socket layer (SSL) encryption techniques, as should be understood by those of ordinary skill in the arts. It should be understood by those of ordinary skill in the arts that these are merely examples of encryption techniques and that other encryption techniques are further contemplated in accordance with aspects of the present disclosure. The additional data may include, but is not limited to, an email address associated with an account of the user, a service set identifier (SSID), and a passphrase. In embodiments, the media playback device 110 may embed this encrypted information in a payload of a pictograph that may be displayed using the media playback device. In some embodiments, the pictograph may be, for example, a quick response (QR) code. It should be understood by those of ordinary skill in the art that this is merely one example of a pictograph, and that other pictographs are further contemplated in accordance with aspects of the present disclosure.

In some embodiments, the media playback device 110 may provide a soft access point. In some embodiments, the soft access point may be used to establish a wireless network between the media playback device 110 and the client device 115. Using this wireless connection, the media playback device 110 and client device 115 may locally communicate with one another.

In some embodiments, the client device 115 may include a device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. The client device 115 may also include an image capture device 117, such as a camera, for scanning the pictograph. In some embodiments, the image capture device 117 may support one or more image resolutions. In some embodiments, an image resolution may be represented as a number of pixel columns (width) and a number of pixel rows (height), such as 1280×720, 1920×1080, 2592×1458, 3840×2160, 4128×2322, 5248×2952, 5312×2988, or the like, where higher numbers of pixel columns and higher numbers of pixel rows are associated with higher image resolutions. In some embodiments, the image capture device 117 may support a first image resolution that is associated with a quick capture mode, such as a low image resolution for capturing and displaying low-detail preview images on a display of the user device.

In some embodiments, the image capture device 117 may support a second image resolution that is associated with a full capture mode, such as a high image resolution for capturing a high-detail image. In some embodiments, the full capture mode may be associated with the highest image resolution supported by the image capture device 117. In some embodiments, by scanning the pictograph, the client device 115 may obtain the payload of the pictograph, and subsequently send the content of the payload, via the network 125, to the server 120 for processing and/or validating the payload. For example, the client device 115 may include an application 119 associated with a provider of the server 120, which may be used to communicate with the server 120, i.e., the application 119 may be used to transmit the content of the payload to the server 120. In this way, the client device 115 provides a secure pathway for providing communications between the media playback device 110 and the server 120.

The server 120 may include a server device (e.g., a host server, a web server, an application server, etc.), a data center device, or a similar device, capable of communicating with the client device 110 via the network 125. In some embodiments, the server 120 may store a private key of the cryptographic certificate of the media playback device 110. Using the public key, the server 120 identify the media playback device 110. In some embodiments, the server 120 may prompt the user to authentic the user account using a username and password associated with the account. That is, the server 120 may prompt the user to enter a username (or email address) and password associated with the account using the application 119 on the client device 115. In some embodiments, the user may enter the username (or email address) and password using the application 119 in order to transmit the payload to the server 120, i.e., the user is authenticated prior to transmitting the payload to the server 120. Thus, in some embodiments, the server 120 may be used to securely identify a particular media playback device using the cryptographic certificate and to authenticate the user using the username/email address and password.

In some embodiments, when the media playback device 110 is not associated with a specific user account, e.g., due to an initial setup or a factory reset, the client device 115 may scan the pictograph and transmit the payload to the server, and in turn, the server 120 may identify the media playback device 110 without the need to authenticate the user.

In some embodiments, in response to identifying the media playback device 110, and, in some instances, authenticating the user, the server 120 may decrypt the payload, including the SSID and passphrase, and generate a reconfiguration request having the SSID and passphrase. In some embodiments, the reconfiguration request may be transmitted to the application 119 of the client device 115, such that the user may enter the SSID and passphrase of the media playback device 110 in order to reconfigure the media playback device 119.

In some embodiments, the media playback device 110 may be associated with an account different than the account of a current user. In this situation, the server 120 may identify the discrepancy between the account associated with the media playback device 110 and the account trying to access the media playback device 110, and to protect the information of the account associated with the media playback device 110, the server 120 may provide the decrypted SSID and passphrase to the user trying to access the media playback device 110 with one or more conditions. For example, the one or more conditions may include an agreement to automatically factory reset the media playback device 110, such that any private information of the account associated with the media playback device 110 is deleted upon the factory reset. In some embodiments, to automatically factory reset the media playback device, the application 119 may be used to prompt the user to agree to such, and in response to the user accepting this agreement, the application 119 may transmit a signal instructing the media playback device 110 to perform the factory reset.

In some embodiments, to reconfigure the media playback device 110, the soft access point of the media playback device 110 may be enabled in order to provide the wireless network between the media playback device 110 and the client device 115. Using this wireless connection, the user may enter the SSID and passphrase of the media playback device 110. In some embodiments, the application 119 of the client device 115 may automatically transmit the SSID and passphrase to the media playback device 110.

In some embodiments, in response to receiving the SSID and passphrase, the media playback device 110 may validate whether these credentials match the SSID and passphrase of the media playback device 110. In some embodiments, in response to validating the received SSID and passphrase, the media playback device 110 may be wirelessly connected to the client device 115 using the soft access point.

In some embodiments, after connecting the media playback device 110 with the client device 115, the media playback device 110 may be reconfigured using the application 119 of the client device 115. For example, reconfiguring the media playback device 110 may include updating wireless settings of the media playback device 110, such that the media playback device 110 may connect to a wireless network, e.g., a home network. Additionally, in some embodiments, in response to validating the received SSID and passphrase, the media playback device 110 may drop the soft access point.

The network 125 may include one or more wired and/or wireless networks. For example, the network 125 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2A:
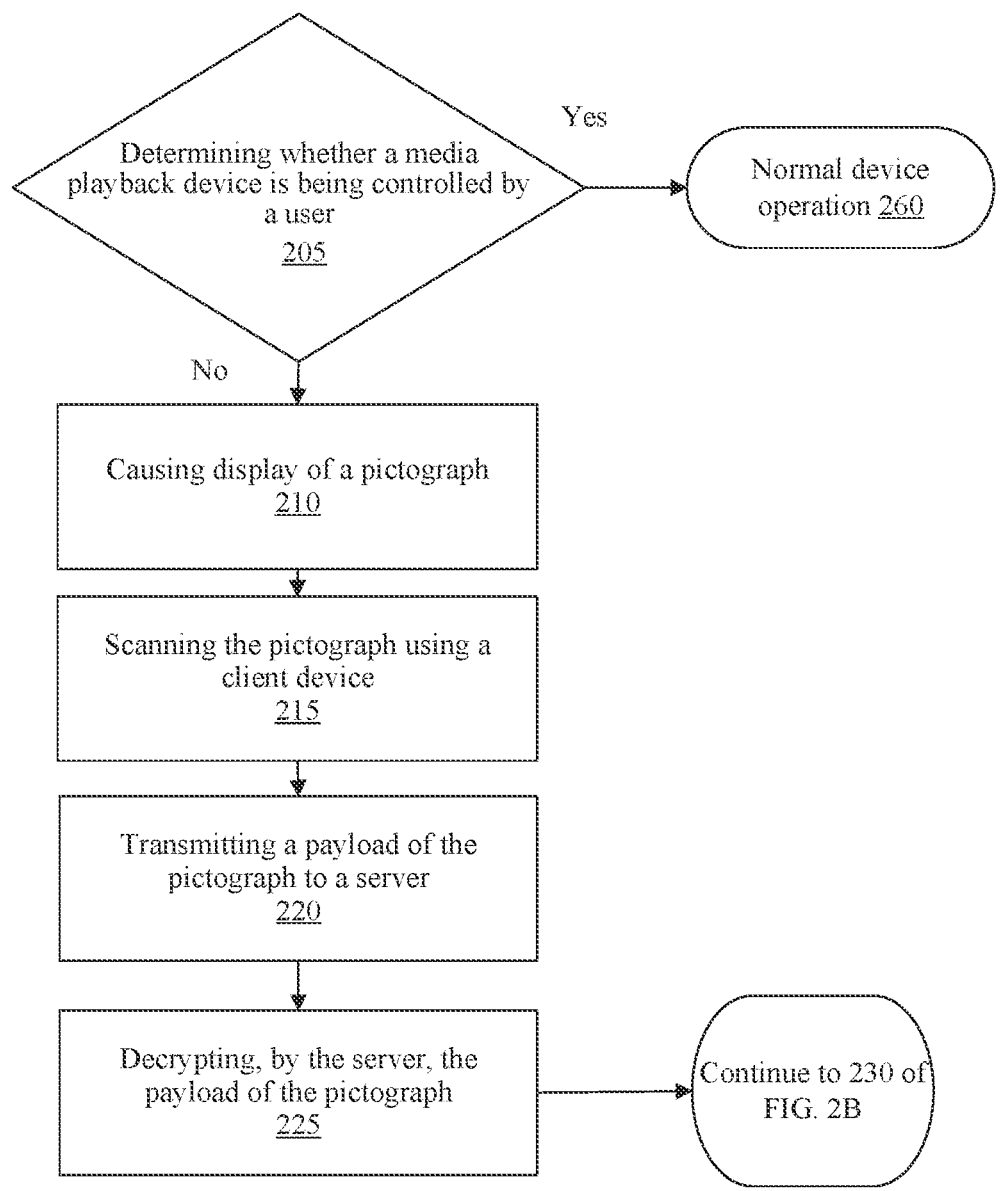
FIGS. 2A and 2B illustrate a flowchart for securely reconfiguring a media playback device, according to some example embodiments.
Figure 2B:
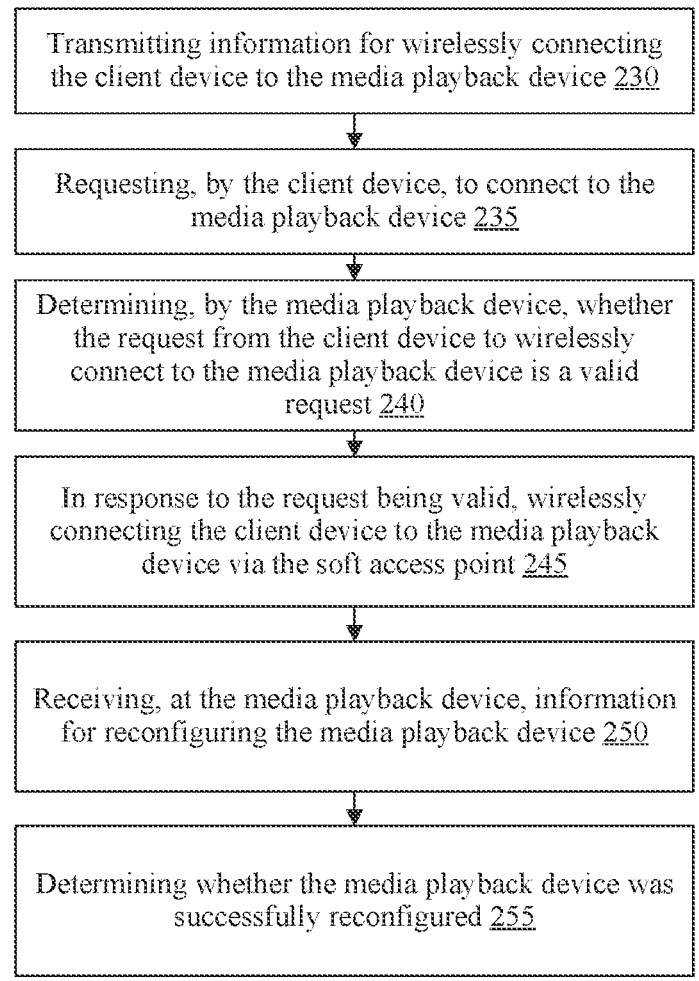

FIGS. 2A and 2B illustrate a flow chart of an example method 200 for securely reconfiguring a media playback device. In some embodiments, one or more processes described with respect to FIG. 2 may be performed by any combination of a media playback device, a client device, and a server (e.g., the media playback device 110, the client device 115, and the server 120 of FIG. 1).

In some embodiments, at 205, the method 200 may include determining whether a media playback device (e.g., the media playback device 110) is being controlled by a user. For example, determining whether the media playback device 110 is being controlled by the user may include determining whether the media playback device 110 completed an initial setup process. In some embodiments, determining that the media playback device 110 is not being controlled by the user may be in response to the media playback device 110 not completing the initial setup process.

In some embodiments, when the media playback device 110 has completed the initial setup process, determining whether the media playback device is being controlled by the user may further include determining whether a user input was received by the media playback device 110 within a specified period of time. For example, the media playback device 110 may determine whether the user controlled the media playback device using a remote control within five (5) minutes of the media playback device 110 being turned on. It should be understood by those of ordinary skill in the art that this is merely an example time period, and that longer or shorter periods of time are further contemplated in accordance with aspects of the present disclosure. In some embodiments, when the user has controlled the media playback device 110 within the specified period of time, the media playback device 110 may be operated in accordance with standard operations.

In some embodiments, in response to determining that the user input was not received within the specified period of time, determining whether the media playback device 110 device is being controlled by the user may further include determining whether the media playback device 110 is connected to a wireless connection. For example, the media playback device 110 may determine whether the media playback device 110 is connected to a wireless connection, such that the media playback device 110 may be controlled using the application 119 operating on the client device 115. In some embodiments, at 260 when the user may control the media playback device 110 using the application 119, the media playback device 110 may be operated in accordance with standard operations.

At 210, in some embodiments, in response to determining that the media playback device 110 is not being controlled by the user, the method may include causing display of a pictograph. For example, in some embodiments, the media playback device 110 may include a display, such that the pictograph may be displayed directly on the media playback device 110. In some embodiments, the media playback device 110 may be coupled to an external device, such that the media playback device may cause the pictograph to be displayed on the external device.

In some embodiments, the pictograph may include an encrypted payload comprising information for wirelessly connecting to a soft access point of the media playback device that may be used to establish a wireless connection between the media playback device 110 and the client device 115. For example, the information for wirelessly connecting to the media playback device may include the SSID and passphrase. In some embodiments, the SSID and passphrase may be encrypted, as discussed herein. In some embodiments, when the media playback device 110 has previously been setup and is associated with a specific user account, the encrypted payload may also include information associated with the specific user account, e.g., username/email address and password. Thus, in some embodiments, the encrypted payload may include the SSID and passphrase for wirelessly connecting to the media playback device 110, and in some instances, may further include information associated with a specific user account.

At 215, the method 200 may include scanning the pictograph using the client device 115. For example, the pictograph may be scanned using the image capture device 117 of the client device 115. In some embodiments, the pictograph may be scanned by using a client device, e.g., the client device 115 of FIG. 1. In some embodiments, the pictograph may include, but is not limited to, a quick response (QR) code, that may be scanned using the client device 115. For example, the QR code may scanned using an image capture device 117 of the client device 115.

At 220, the method 200 may include transmitting the payload of the pictograph from the client device 115 to a server, e.g., server 120 of FIG. 1. For example, the client device 115 may transmit the payload to the server 120 using the application 119 over the network 125.

At 225, the method 200 may include decrypting, by the server 120, the payload to identify the media playback device 110. In some embodiments, the server 120 may also authenticate the user using the information from the payload.

In response to identifying the media playback device 110, and in some instances, authenticating the user, at 230, the method 200 may include transmitting, by the server 120 and to the client device 115, information for wirelessly connecting the client device 115 to the media playback device 110. For example, in some embodiments, the information may include the SSID and passphrase of the media playback device.

At 235, the method 200 may include requesting, by the client device 115, to connect to the media playback device 110. For example, the reconfiguration request may be transmitted from the client device 115 to the media playback device 110 using the soft access point. For example, the user may use the client device 115 to connect the soft access point of the media playback device 110 using the SSID and passphrase of the media playback device 110. In some embodiments, the client device 115 may automatically attempt to connect to the media playback device 110 in response to receiving the credentials from the server 120.

At 240, the method 200 may include determining, by the media playback device 110, whether the request from the client device to wirelessly connect to the media playback device 110 is a valid request. For example, the media playback device 110 may determine whether the SSID and passphrase provided by the client device 115 match the SSID and passphrase of the media playback device 110.

At 245, in response to the request being valid, the method 200 may include wirelessly connecting the client device 115 to the media playback device 110 via the soft access point. In some embodiments, in response to determining that the request to wirelessly connect to the media playback device is not a valid request, the method may include iteratively repeating 210-240 until a valid request is received.

At 250, the method 200 may include receiving, at the media playback device 110, information for reconfiguring the media playback device 110. For example, the information for reconfiguring the media playback device 110 may include updated wireless settings for the media playback device. In this way, the media playback device 110 may be connected a local network.

In some embodiments, at 255, the method 200 may also include determining whether the media playback device 110 was successfully reconfigured. For example, determining whether the media playback device 110 was successfully reconfigured may include testing the wireless connection of media playback device.

Figure 3:
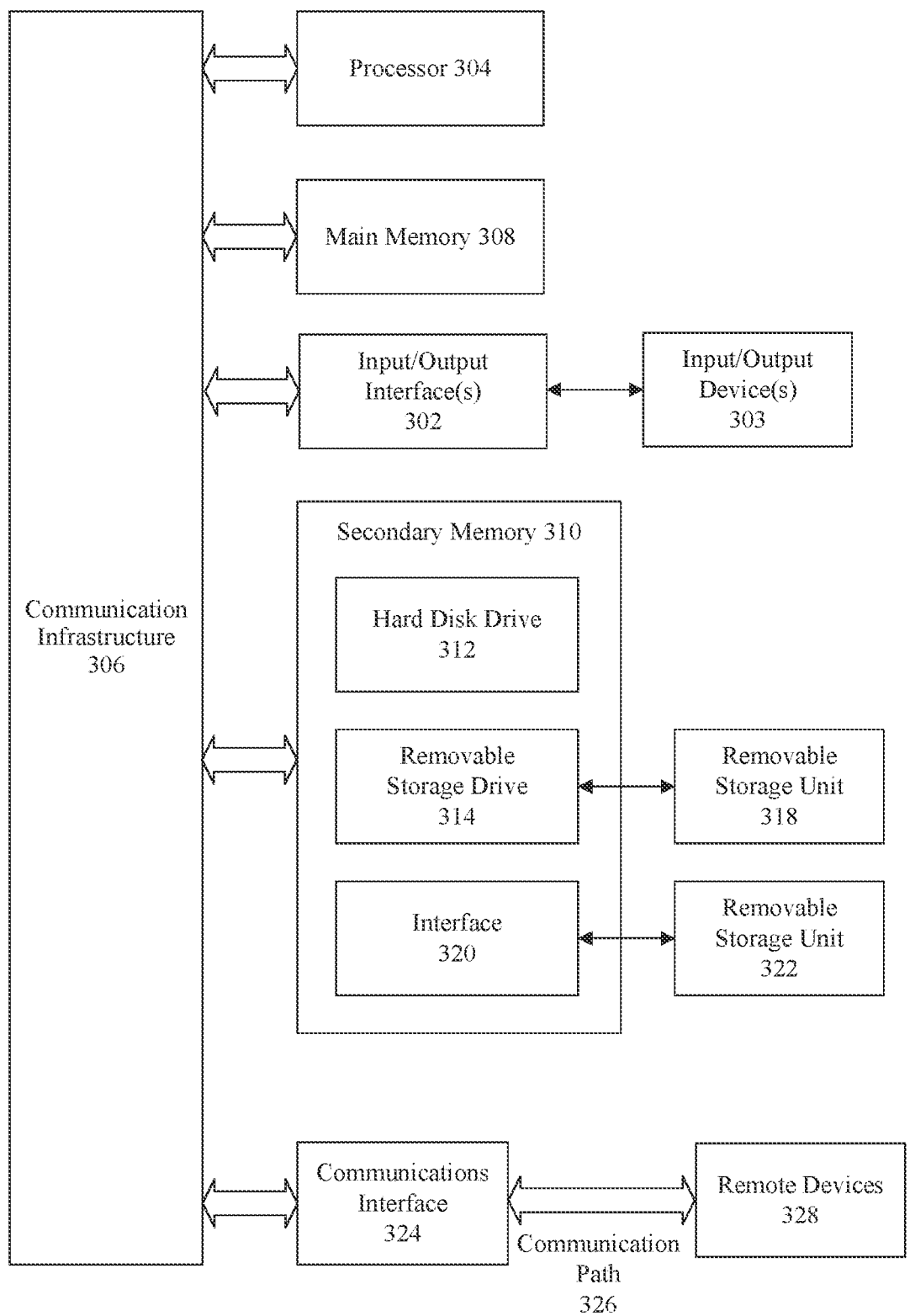
FIG. 3 is an example computer system useful for implementing various embodiments.

Various embodiments can be implemented, for example, using one or more well-known computer systems, such as computer system 300 shown in FIG. 3. Computer system 300 can be any well-known computer capable of performing the functions described herein, such as computers available from International Business Machines, Apple, Sun, HP, Dell, Sony, Toshiba, etc.

Computer system 300 includes one or more processors (also called central processing units, or CPUs), such as a processor 304. Processor 304 is connected to a communication infrastructure or bus 306. Processor 304 may be a graphics processing unit (GPU). In some embodiments, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 300 also includes user input/output device(s) 303, such as monitors, keyboards, pointing devices, etc., which communicate with communication infrastructure or bus 306 through user input/output interface (s) 302.

Computer system 300 also includes a main or primary memory 308, such as random access memory (RAM). Main memory 308 may include one or more levels of cache. Main memory 308 has stored therein control logic (i.e., computer software) and/or data.

Computer system 300 may also include one or more secondary storage devices or memory 310. Secondary memory 310 may include, for example, a hard disk drive 312 and/or a removable storage device or drive 314. Removable storage drive 314 may be a floppy disk drive, a magnetic tape drive, a compact disk drive, an optical storage device, tape backup device, and/or any other storage device/drive.

Removable storage drive 314 may interact with a removable storage unit 318. Removable storage unit 318 may include a computer usable or readable storage device having stored thereon computer software (control logic) and/or data. Removable storage unit 318 may be program cartridge and cartridge interface (such as that found in video game devices), a removable memory chip (such as an EPROM or PROM) and associated socket, a memory stick and USB port, a memory card and associated memory card slot, and/or any other removable storage unit and associated interface. Removable storage drive 314 may read from and/or write to removable storage unit 318.

Secondary memory 310 may include other means, devices, components, instrumentalities or other approaches for allowing computer programs and/or other instructions and/or data to be accessed by computer system 300. Such means, devices, components, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 may enable computer system 300 to communicate and interact with any combination of external devices, external networks, external entities, etc. (individually and collectively referenced by reference number 328). For example, communication interface 324 may allow computer system 300 to communicate with external or remote devices 328 over communications path 326, which may be wired and/or wireless (or a combination thereof), and which may include any combination of LANs, WANs, the Internet, etc. Control logic and/or data may be transmitted to and from computer system 300 via communication path 326.

Computer system 300 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 300 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 300 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), may cause such data processing devices to operate as described herein.

Embodiments of the present embodiments have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

Based on the teachings contained in this disclosure, it will be apparent to persons skilled in the relevant art(s) how to make and use embodiments of this disclosure using data processing devices, computer systems and/or computer architectures other than that shown in FIG. 3. In particular, embodiments can operate with software, hardware, and/or operating system implementations other than those described herein.

While this disclosure describes example embodiments for example fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

The foregoing description of the example embodiments will so fully reveal the general nature of the invention that others can, by applying knowledge within the skill of the art, readily modify and/or adapt for various applications such specific embodiments, without undue experimentation, without departing from the general concept of the disclosure. Therefore, such adaptations and modifications are intended to be within the meaning and range of equivalents based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described example embodiments, but should be defined only in accordance with the following claims and their equivalents.

What is claimed is:

1. A computing device, comprising:
an image capture device configured to capture a pictograph displayed by a media playback device, wherein the pictograph comprises a payload comprising encrypted information for connecting the computing device to the media playback device and a cryptographic certificate to identify the media playback device by a server;
an application operated by a processor communicatively coupled to the image capture device, wherein the application is configured to:
send a content of the payload via a network to the server for validating the payload to identify the media playback device;
receive a reconfiguration request from the server, wherein the reconfiguration request includes information for connecting the computing device to the media playback device, wherein the information included in the reconfiguration request is obtained from the server by decrypting the encrypted information of the payload;
send the reconfiguration request to the media playback device, wherein the information included in the reconfiguration request is validated by the media playback device; and
in response to a validation of the information included in the reconfiguration request, connect the computing device to the media playback device.

2. The computing device of claim 1, wherein the application is further configured to reconfigure the media playback device by updating wireless settings of the media playback device.

3. The computing device of claim 1, wherein the application is further configured to receive a username and a password from a user to authenticate the user by the server, and wherein the username and the password are for a user account associated with the media playback device.

4. The computing device of claim 1, wherein the information included in the reconfiguration request includes a service set identifier (S SID) and a passphrase, and the encrypted information of the payload includes an encrypted SSID and an encrypted passphrase.

5. The computing device of claim 4, wherein the validation of the information included in the reconfiguration request is determined by matching the SSID and the passphrase contained in the reconfiguration request to a corresponding SSID and a corresponding passphrase stored in the media playback device.

6. The computing device of claim 1, wherein the computing device is connected to the media playback device via a soft access point, and the payload comprises a network name and a passphrase for the soft access point.

7. The computing device of claim 1, wherein the pictograph comprises a quick response (QR) code.

8. The computing device of claim 1, wherein the image capture device includes a camera for scanning the pictograph.

9. The computing device of claim 1, wherein the image capture device supports one or more image resolutions.

10. A computer-implemented method for a computing device, comprising:
  capturing, by an image capture device, a pictograph displayed by a media playback device, wherein the pictograph comprises a payload comprising encrypted information for connecting the computing device to the media playback device and a cryptographic certificate to identify the media playback device by a server;
  sending a content of the payload via a network to the server for validating the payload to identify the media playback device;
  receiving a reconfiguration request from the server, wherein the reconfiguration request includes information for connecting the computing device to the media playback device, wherein the information included in the reconfiguration request is obtained from the server by decrypting the encrypted information of the payload;
  sending the reconfiguration request to the media playback device, wherein the information included in the reconfiguration request is validated by the media playback device; and
  in response to a validation of the information included in the reconfiguration request, connecting the computing device to the media playback device.

11. The method of claim 10, further comprising:
  reconfiguring the media playback device by updating wireless settings of the media playback device.

12. The method of claim 10, further comprising:
  receiving a username and a password from a user to authenticate the user by the server, and wherein the username and the password are for a user account associated with the media playback device.

13. The method of claim 10, wherein the information included in the reconfiguration request includes a service set identifier (SSID) and a passphrase, and the encrypted information of the payload includes an encrypted SSID and an encrypted passphrase.

14. The method of claim 13, wherein the validation of the information included in the reconfiguration request is determined by matching the SSID and the passphrase contained in the reconfiguration request to a corresponding SSID and a corresponding passphrase stored in the media playback device.

15. The method of claim 10, wherein the pictograph comprises a quick response (QR) code.

16. A non-transitory, tangible computer-readable medium having instructions stored thereon that, when executed by at least one computing device, cause the at least one computing device to perform operations comprising:
  capturing, by an image capture device, a pictograph displayed by a media playback device, wherein the pictograph comprises a payload comprising encrypted information for connecting the at least one computing device to the media playback device and a cryptographic certificate to identify the media playback device by a server;
  sending a content of the payload via a network to the server for validating the payload to identify the media playback device;
  receiving a reconfiguration request from the server, wherein the reconfiguration request includes information for connecting the at least one computing device to the media playback device, wherein the information included in the reconfiguration request is obtained from the server by decrypting the encrypted information of the payload;
  sending the reconfiguration request to the media playback device, wherein the information included in the reconfiguration request is validated by the media playback device; and
  in response to a validation of the information included in the reconfiguration request, connecting the at least one computing device to the media playback device.

17. The non-transitory, tangible computer-readable medium of claim 16, the operations further comprising:
  reconfiguring the media playback device by updating wireless settings of the media playback device.

18. The non-transitory, tangible computer-readable medium of claim 16, the operations further comprising:
  receiving a username and a password from a user to authenticate the user by the server, and wherein the username and the password are for a user account associated with the media playback device.

19. The non-transitory, tangible computer-readable medium of claim 16, wherein the information included in the reconfiguration request includes a service set identifier (SSID) and a passphrase, and the encrypted information for connecting the at least one computing device includes an encrypted SSID and an encrypted passphrase.

20. The non-transitory, tangible computer-readable medium of claim 19, wherein the validation of the information included in the reconfiguration request is determined by matching the SSID and the passphrase contained in the reconfiguration request to a corresponding SSID and a corresponding passphrase stored in the media playback device.

* * * * *